(12) United States Patent
Muramatsu et al.

(10) Patent No.: US 10,000,150 B2
(45) Date of Patent: Jun. 19, 2018

(54) LIGHTING CIRCUIT AND VEHICLE LAMP

(71) Applicant: KOITO MANUFACTURING CO., LTD., Tokyo (JP)

(72) Inventors: Takao Muramatsu, Shizuoka (JP); Satoshi Kikuchi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days. days.

(21) Appl. No.: 15/686,520

(22) Filed: Aug. 25, 2017

(65) Prior Publication Data

US 2018/0056853 A1    Mar. 1, 2018

(30) Foreign Application Priority Data

Aug. 25, 2016 (JP) .................................. 2016-164836

(51) Int. Cl.
| | | |
|---|---|---|
| *B60Q 1/14* | (2006.01) | |
| *H05B 33/08* | (2006.01) | |
| *H05B 37/02* | (2006.01) | |

(52) U.S. Cl.
CPC ........ *B60Q 1/1415* (2013.01); *B60Q 2300/42* (2013.01); *B60Q 2300/45* (2013.01)

(58) Field of Classification Search
CPC ................ H05B 33/08; H05B 33/0824; H05B 33/0827; H05B 33/083; H05B 33/0839; H05B 37/02; H05B 37/0209; B60Q 1/04; B60Q 1/14; B60Q 1/1415
See application file for complete search history.

(56) References Cited

U.S. PATENT DOCUMENTS

| | | | | |
|---|---|---|---|---|
| 7,276,863 | B2 * | 10/2007 | Lee ........................ | G09G 3/342 315/307 |
| 2010/0052569 | A1 * | 3/2010 | Hoogzaad .......... | H05B 33/0818 315/294 |
| 2013/0088172 | A1 * | 4/2013 | Kikuchi ............. | H05B 33/0815 315/307 |
| 2014/0265890 | A1 * | 9/2014 | Ito ........................... | B60Q 1/00 315/186 |
| 2016/0096467 | A1 * | 4/2016 | Murakami .......... | F21S 48/1757 315/82 |

FOREIGN PATENT DOCUMENTS

JP           2015-153657 A    8/2015

* cited by examiner

*Primary Examiner* — Thai Pham
(74) *Attorney, Agent, or Firm* — Osha Liang LLP (57) ABSTRACT

A lighting circuit drives a light source including plural light emitting elements and includes a bypass switch circuit which includes plural bypass switches connected in parallel with the plural light emitting elements, a boost converter which boosts a power supply voltage to generate a direct current voltage stabilized at a variable target voltage, a buck converter which receives the direct current voltage to supply a driving current stabilized at a target current to the light source and which includes a hysteresis controller configured to stabilize the driving current between a peak value and a bottom value and to change a difference between the peak value and the bottom value such a switching frequency of the buck converter approaches a constant value, and a voltage adjusting circuit which is configured to dynamically change the target voltage of the boost converter according to an output voltage of the buck converter.

12 Claims, 10 Drawing Sheets

LIGHTING CIRCUIT AND VEHICLE LAMP

CROSS-REFERENCE TO RELATED APPLICATIONS

The present application claims the benefit of priority of Japanese Patent Application No. 2016-164836, filed on Aug. 25, 2016, the content of which is incorporated herein by reference.

TECHNICAL FIELD

The present invention relates to a lamp for an automobile or the like.

BACKGROUND

A vehicle lamp can generally switch between a low beam and a high beam. The low beam provides a predetermined illumination for a nearby area and has light distribution designed to not give glare to an oncoming vehicle or a preceding vehicle. The low beam is mainly used when driving in urban areas. On the other hand, the high beam provides a bright illumination for a front wide area and a distant area. The high beam is mainly used when driving at high speed on a road with few oncoming vehicles or preceding vehicles. Therefore, although the high beam gives better visibility to a driver than the low beam does, the high beam would give glare to a driver of a preceding vehicle or a pedestrian in front of the vehicle (for example, JP-A-2015-153657).

In recent years, Adaptive Driving Beam (ADB) technique has been proposed which dynamically and adaptively controls a light distribution pattern of a high beam based on conditions surrounding the vehicle. The ADB technique reduces glare to a vehicle or a pedestrian by detecting presence of a preceding vehicle, an oncoming vehicle or a pedestrian in front of the vehicle and reducing light of an area corresponding to the detected vehicle or pedestrian.

Figure 1A:
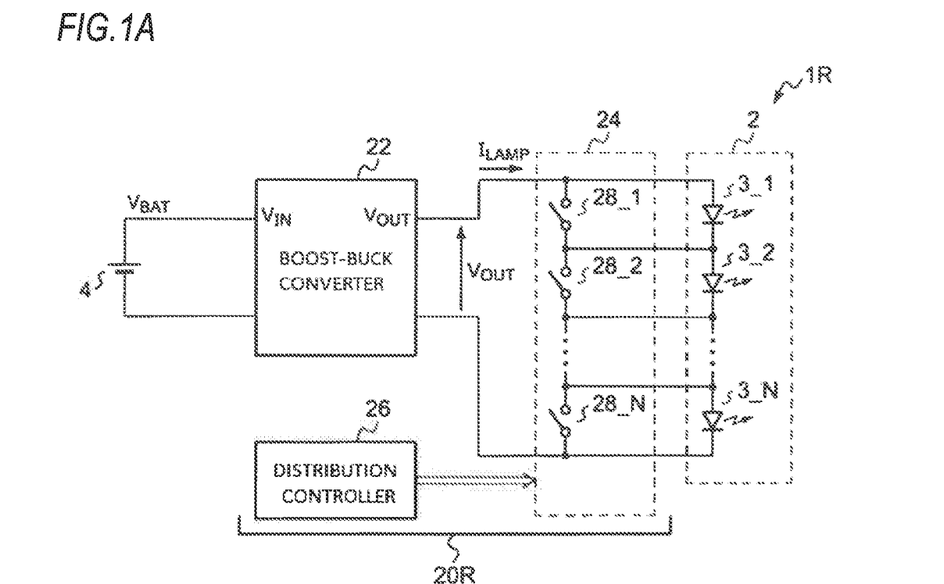
FIGS. 1A and 1B are block diagrams of a vehicle lamp with an ADB function according to comparative technique.
Figure 1B:
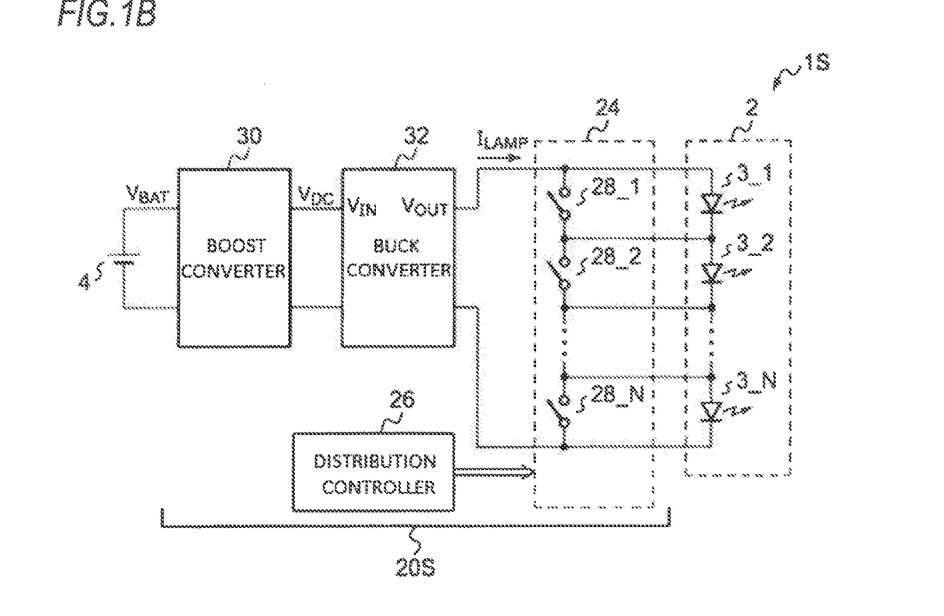

A vehicle lamp with an ADB function will be described. FIGS. 1A and 1B are block diagrams of a vehicle lamp with the ADB function according to comparative technique. The comparative technique should not be recognized as a prior art.

Referring to FIG. 1A, a vehicle lamp 1R includes a light source 2 and a lighting circuit 20R. A high beam illumination area of the ADB is divided into N sub-areas (N is a natural number equal to or more than 2). The light source 2 includes a plurality of light emitting elements 3_1 to 3_N corresponding to the N sub-areas, respectively. Each light emitting element 3 is a semiconductor device, such as a Light Emitting Diode (LED) or a Laser Diode (LD), and is disposed to illuminate the corresponding sub-area.

The lighting circuit 20R receives a power supply voltage $V_{BAT}$ from a battery 4 and changes a light distribution of the high beam by individually controlling ON (lighting-on) and OFF (lighting-off) of each of the light emitting elements 3_1 to 3_N. Further, the lighting circuit 20R adjusts an effective luminance by controlling a current $I_{LAMP}$ flowing into the light emitting element 3 by Pulse Width Modulation (PWM) at high frequency.

The lighting circuit 20R includes a boost-buck converter 22, a bypass switch circuit 24, and a light distribution controller 26. The boost-buck converter 22 is a constant current converter which generates an output current $I_{LAMP}$ stabilized at a target value $I_{REF}$ to be supplied to the light source 2.

The bypass switch circuit 24 includes a plurality of bypass switches 28_1 to 28_N corresponding to the plurality of light emitting elements 3_1 to 3_N. Each bypass switch 28_i is connected in parallel with the corresponding light emitting element 3. When the bypass switch 28_i is off, the driving current $I_{LAMP}$ flows into the corresponding light emitting element 3_i such that the light emitting element 3_i lights on. When the bypass switch 28_i is on, the driving current $I_{LAMP}$ flows into the bypass switch 28_i such that the corresponding light emitting element 3_i lights off.

The light distribution controller 26 controls ON/OFF of the plurality of bypass switches 28_1 to 28_N based on a light distribution pattern. Further, the light distribution controller 26 controls the plurality of bypass switches 28_1 to 28_N individually by PWM to perform PWM dimming of the plurality of light emitting elements 3_1 to 3_N.

Assuming the driving current $I_{LAMP}$ flows into M light emitting elements among the plurality of light emitting elements 3_1 to 3_N (0≤M≤N), a voltage between both ends of the light source 2, i.e., an output voltage $V_{OUT}$ of the boost-buck converter 22, is $M \times V_F$. Here, for ease of understanding, a forward voltage $V_F$ of the light emitting element 3 is assumed to be uniform. Therefore, the output voltage $V_{OUT}$ of the boost-buck converter 22 varies by time based on the combination of ON and OFF of the plurality of bypass switches 28_1 to 28_N.

As described above, the boost-buck converter 22 can be regarded as a constant current source which generates the constant driving current $I_{LAMP}$. It is noted that the boost-buck converter 22 does not actively change the output voltage $V_{OUT}$. The output voltage $V_{OUT}$ changes as a result of dynamical changing of the combined impedance of the light source 2 and the bypass switch circuit 24, i.e., the load impedance of the boost-buck converter 22.

Referring to FIG. 1B, a lighting circuit 20S includes a boost converter 30 and a buck converter 32 connected in series in place of the boost-buck converter 22 of FIG. 1A. When $V_F$=5 V and N=12, the voltage between both ends of the light source 2 varies dynamically from 0 to 60V. The boost converter 30 is a constant voltage converter which stabilizes an output direct current voltage $V_{DC}$ at a voltage level higher than the maximum value 60V of the voltage between both ends of the light source 2. The buck converter 32 has a constant current output similar to that of the boost-buck converter 22 of FIG. 1A and stabilizes the current $I_{LAMP}$ of the light source 2 at a predetermined target value.

Figure 2:
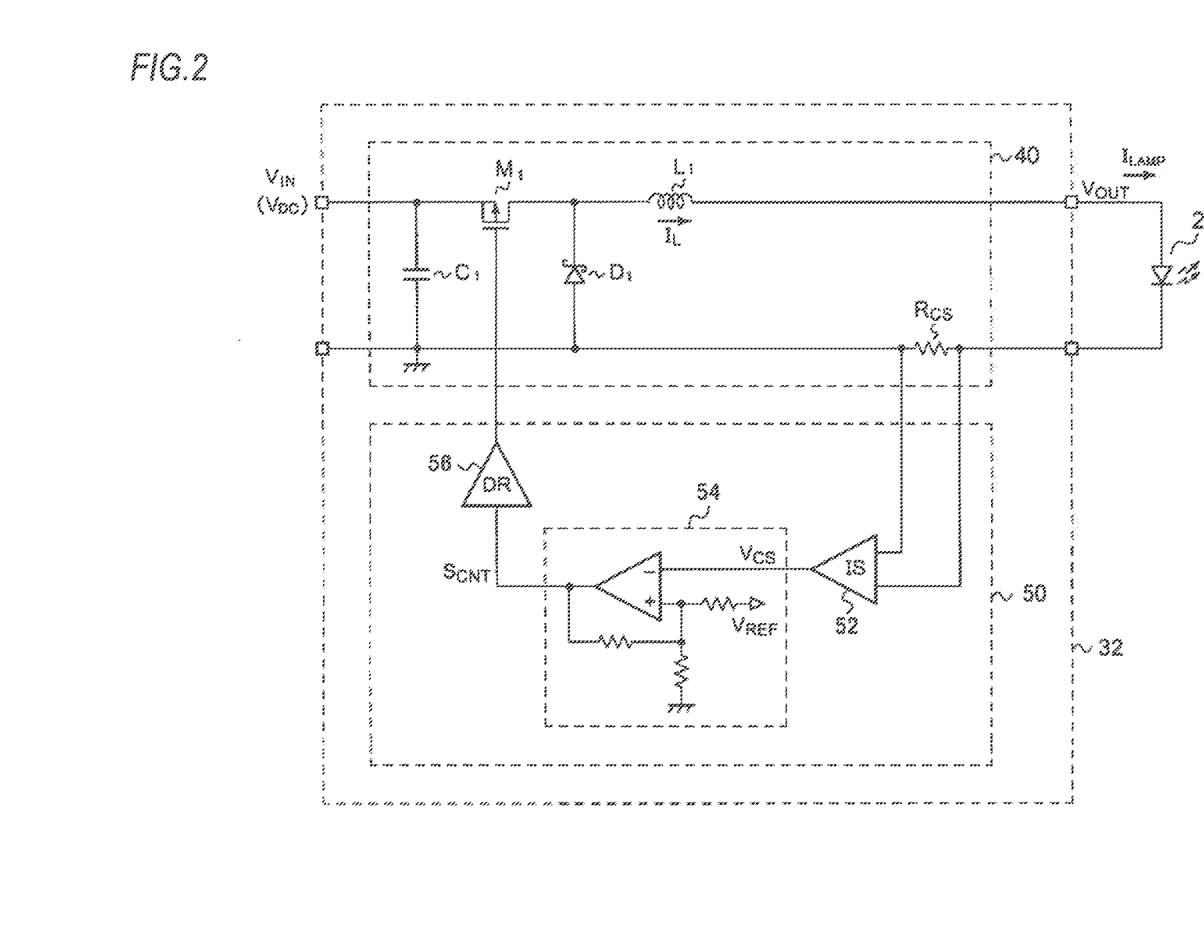
FIG. 2 is a circuit diagram of a buck converter with hysteresis control.

After examining the lighting circuit 20S of FIG. 1B, the inventors have recognized the following problems. That is, since the frequency of the PWM dimming performed by the bypass switch circuit 24 is several hundreds of Hz, the load impedance of the buck converter 32 also changes at several hundreds of Hz. In order to realize such high-speed responsiveness, it is necessary to perform hysteresis control (Bang-Bang control) in the buck converter 32. FIG. 2 is a circuit diagram of the buck converter 32 with the hysteresis control.

The buck converter 32 includes an output circuit 40 and a hysteresis controller 50. The output circuit 40 includes an input capacitor $C_1$, a switching transistor $M_1$, a rectifier diode $D_1$, an inductor $L_1$, and a current sense resistor $R_{CS}$.

In the hysteresis control, an upper limit current $I_{UPPER}$ and a bottom limit current $I_{BOTTOM}$ are defined in proximity to a target value $I_{REF}$ of the driving current $I_{LAMP}$ which is a control object. The switching transistor turns off when the driving current $I_{LAMP}$ (coil current $I_L$) reaches the upper limit current $I_{UPPER}$, and the switching transistor turns on when the driving current $I_{LAMP}$ falls to the bottom limit current $I_{BOTTOM}$, and this cycle is repeated.

The hysteresis controller 50 includes a current detection circuit 52, a hysteresis comparator 54, and a driver 56. The current sense resistor $R_{CS}$ is provided on a path of the driving current $I_{LAMP}$. A voltage drop proportional to the driving current $I_{LAMP}$ is generated between both ends of the current sense resistor $R_{CS}$. The current detection circuit 52 generates a current detection signal $V_{CS}$ corresponding to the voltage drop of the current sense resistor $R_{CS}$. The hysteresis comparator 54 compares the current detection signal $V_{CS}$ with an upper threshold $V_{THH}$ corresponding to the upper limit current $I_{UPPER}$ and a bottom threshold $V_{THL}$ corresponding to the bottom limit current $I_{BOTTOM}$, and generates a control pulse $S_{CNT}$ corresponding to the comparison results. The driver 56 drives the switching transistor $M_1$ according to the control pulse $S_{CNT}$.

Figure 3:
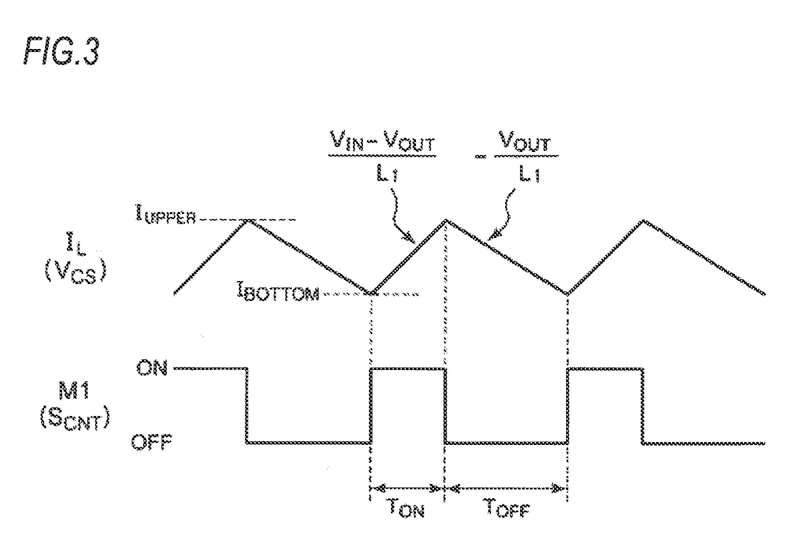
FIG. 3 is an operation waveform diagram of the buck converter of the FIG. 2.

FIG. 3 is an operation waveform diagram of the buck converter 32 of FIG. 2. In a section where the control pulse $S_{CNT}$ is at an ON level (for example, a high level), the switching transistor $M_1$ is on, and in a section where the control pulse $S_{CNT}$ is at an OFF level (for example, a low level), the switching transistor $M_1$ is off. When the switching transistor $M_1$ is on, a voltage between both ends of the inductor $L_1$ is $V_{IN}-V_{OUT}$. Therefore, the coil current $I_L$ flowing into the inductor $L_1$ (i.e., the driving current $I_{LAMP}$) rises with a slope of $(V_{IN}-V_{OUT})/L_1$. When the switching transistor $M_1$ is off, a voltage between both ends of the inductor $L_1$ is $-V_{OUT}$. Therefore, the coil current $I_L$ (i.e., the driving current $I_{LAMP}$) falls with a slope of $-V_{OUT}/L_1$.

The ON time $T_{ON}$ and OFF time $T_{OFF}$ of the switching transistor $M_1$ are given by equations (1) and (2).

$$T_{ON}=\Delta I/\{(V_{IN}-V_{OUT})/L_1\} \tag{1}$$

$$T_{OFF}=\Delta I/(V_{OUT}/L_1) \tag{2}$$

$\Delta I$ is a hysteresis width (ripple width) of the coil current $I_L$, that is, the difference between a peak value $I_{UPPER}$ and a bottom value $I_{BOTTOM}$. $\Delta I$ is proportional to the difference $\Delta V$ between the upper threshold signal $V_{THH}$ and the bottom threshold signal $V_{THL}$ as shown in the following equation.

$$\Delta I=\Delta V/R_{CS}$$

In the vehicle lamp 1S of FIG. 1B, although an input voltage $V_{IN}$ ($V_{DC}$) of the buck converter 32 remains constant, the output voltage $V_{OUT}$ fluctuates dynamically with the PWM control of the bypass switch circuit 24. The switching period $T_{ON}+T_{OFF}$ of the switching transistor $M_1$, i.e. switching frequency $f_{SW}$, fluctuates with the output voltage $V_{OUT}$, which makes it difficult to deal with electromagnetic noise.

SUMMARY

The present invention has been made in view of the above circumstances, and an aspect of the present invention provides a vehicle lamp capable of suppressing frequency fluctuation of a switching converter.

An aspect of the present invention provides a lighting circuit configured to drive a light source including a plurality of light emitting elements connected in series. The lighting circuit includes a bypass switch circuit, a boost converter, a buck converter, and a voltage adjusting circuit. The bypass switch circuit includes a plurality of bypass switches, each of which is connected in parallel with corresponding light emitting element of the plurality of light emitting elements. The boost converter is configured to boost a power supply voltage to generate a direct current voltage stabilized at a variable target voltage. The buck converter is configured to receive the direct current voltage to supply a driving current stabilized at a target current to the light source. The buck converter includes a hysteresis controller of a hysteresis control method. The hysteresis controller is configured to stabilize the driving current between a peak value and a bottom value which are defined in proximity to the target current and to change a difference between the peak value and the bottom value such that a switching frequency of the buck converter approaches a constant value. The voltage adjusting circuit is configured to dynamically change the target voltage of the boost converter according to an output voltage of the buck converter.

According to the above configuration, the output voltage of the buck converter can follow high speed load variation by using the hysteresis control. Further, since the switching frequency can be stabilized by controlling the difference between the peak value and the bottom value, the noise specs can be cleared.

When the input voltage of the buck converter remains constant and the switching frequency is stabilized, the difference between the input voltage and the output voltage of the buck converter may become large. In this case, in order to reduce the coil current and thus reduce a fluctuation width (ripple width) of the driving current, it is necessary to select a component with a large inductance and thus a large-size component as the inductor (coil). Regarding this problem, the difference between the input voltage and the output voltage of the buck converter can be reduced, thus the ripple width with respect to the same inductance value can be reduced and a small inductor can be selected accordingly in the above configuration.

The voltage adjusting circuit may be configured to change the target voltage such that a difference between the target voltage of the boost converter and the output voltage of the buck converter does not exceed or approaches a predetermined value.

Thus, the voltage between both ends of the inductor of the buck converter can be kept at a predetermined value, and the size of the inductor can be reduced by reducing the predetermined value.

The voltage adjusting circuit may be configured to change the target voltage faster at rise of the output voltage of the buck converter than at fall of the output voltage of the buck converter. Thus, the control of the buck converter can be prevented from being unstable.

The voltage adjusting circuit may be configured to change the target voltage in a time shorter than a control period of the bypass switch circuit when the output voltage of the buck converter rises. Thus, the insufficiency of the output voltage (the voltage between both ends of the light source) of the buck converter, and the decrease in the luminance of the light source can be suppressed.

The voltage adjusting circuit may be configured to change the target voltage in a time shorter than ½ of the control period of the bypass switch circuit when the output voltage of the buck converter rises.

The voltage adjusting circuit may be configured to change the target voltage in a time longer than the control period of the bypass switch circuit when the output voltage of the buck converter falls. Thus, the oscillation of the buck converter can be suppressed.

The voltage adjusting circuit may be configured to change the target voltage in a time longer than three times of the control period of the bypass switch circuit when the output voltage of the buck converter falls.

The voltage adjusting circuit includes a peak hold circuit which is configured to receive an output detection voltage corresponding to the output voltage of the buck converter. The target voltage may be corresponding to the output voltage of the peak hold circuit. Thus, the target voltage can be controlled by a simple analog circuit.

The voltage adjusting circuit includes a diode which is configured to receive an output detection voltage corresponding to the output voltage of the buck converter at an anode thereof, a first resistor which is provided between a cathode of the diode and a ground, a capacitor which includes one end grounded, and a second resistor which is provided between the other end of the capacitor and the cathode of the diode. The target voltage may be set according to the voltage of the capacitor.

The voltage adjusting circuit includes an A/D converter which is configured to convert the output detection voltage corresponding to the output voltage of the buck converter into a digital value, a peak detection circuit which is configured to generate a peak detection signal representing a peak of the digital value, a filter which is configured to receive the peak detection signal and has a faster responsiveness in a rising direction and a slower responsiveness in a falling direction, and a D/A converter which is configured to convert an output signal of the filter into an analog voltage. The voltage adjusting circuit may set the target voltage according to the analog voltage.

The lighting circuit may further include a light distribution controller which is configured to control the plurality of bypass switches according to a desired light distribution pattern. The voltage adjusting circuit may be configured to control the target voltage based on a voltage between both ends of the light source estimated from ON/OFF states of the plurality of bypass switches. Response delay can be suppressed by the feed forward control based on the estimated value of the voltage between both ends of the light source.

The lighting circuit may be configured to drive a plurality of light sources and include a plurality of buck converters corresponding to the plurality of light sources. The voltage adjusting circuit may be configured to change the target voltage according to a highest voltage among output voltages of the plurality of buck converters. Thus, one boost converter can be shared by the plurality of buck converters, and the circuit scale can be reduced.

Another aspect of the present invention provides a vehicle lamp. The vehicle lamp includes a light source including a plurality of light emitting elements connected in series and the above-described lighting circuits for driving the light source.

Any combination of the above constituent elements, and the constituent elements and expressions substituted in methods, apparatus, systems, or the like are also effective as aspects of the present invention.

According to an aspect of the present invention, the frequency fluctuation of the switching converter can be suppressed.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

DETAILED DESCRIPTION

Embodiments of the present invention will be described with reference to the drawings. Identical or equivalent components, members, and processes shown in each drawing are given with same reference numerals, and repeated descriptions are omitted appropriately. The embodiments are not intended to limit the scope of the present invention but are merely illustrative, and all features described in the embodiments and combinations thereof are not essential to the present invention.

In the specification, "a state where a member A is connected to a member B" includes not only a case where the member A and the member B are connected physically and directly, but also a case where the member A and the member B are connected indirectly via other members which do not cause substantial effects on an electrical connection state thereof or do not impair functions or effects due to the connection thereof.

Similarly, "a state where a member C is provided between a member A and a member B" includes not only a case where the member A and the member C, or the member B and the member C, are connected directly, but also a case where the member A and the member C, or the member B and the member C, are connected indirectly via other members which do not cause substantial effects on an electrical connection thereof or do not impair functions or effects due to the connection thereof.

For ease of understanding, a vertical axis and a horizontal axis of a waveform diagram or a time chart referenced in the present specification are enlarged and reduced appropriately, and each waveform is also simplified, exaggerated or emphasized.

In the specification, reference numerals given to electrical signals such as voltage signals and current signals, or circuit elements such as resistors and capacitors represent voltage values and current values, or resistance values and capacitance values.

Figure 4:
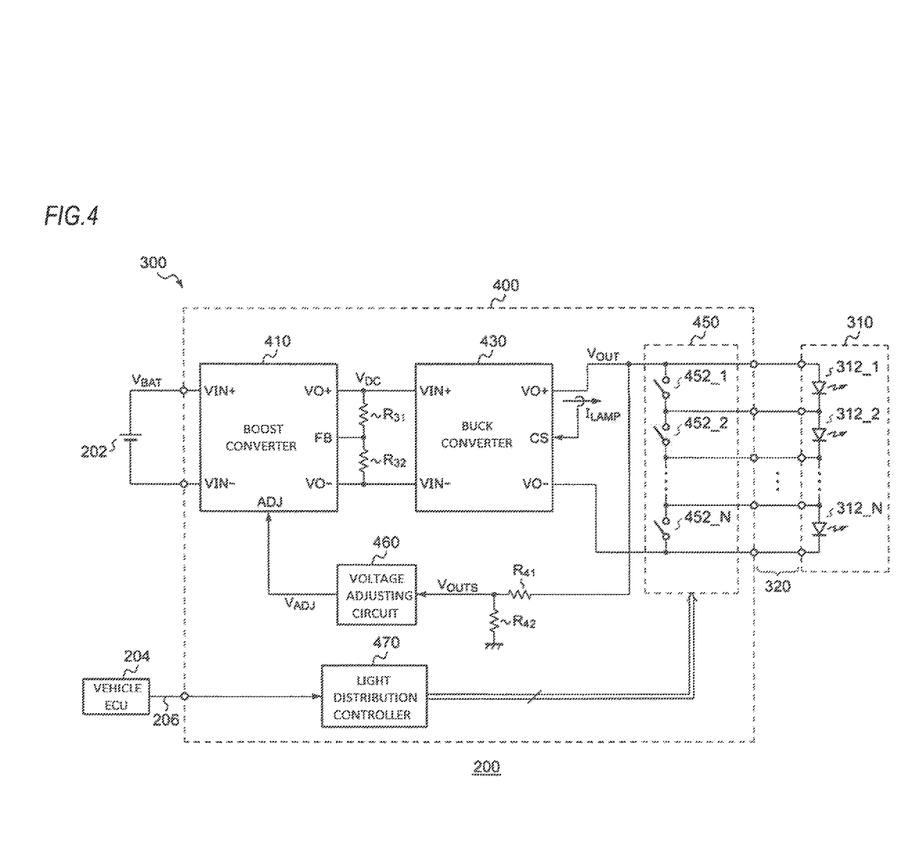
FIG. 4 is a block diagram of a vehicle lamp including a lighting circuit according to an embodiment.

FIG. 4 is a block diagram of a vehicle lamp 300 including a lighting circuit 400 according to an embodiment. The vehicle lamp 300 configures a lamp system 200 together with a battery 202 and a vehicle Electronic Control Unit (ECU) 204. The battery 202 supplies a battery voltage (a power supply voltage) $V_{BAT}$ of 12V or 24V. The lighting circuit 400 receives the battery voltage $V_{BAT}$ as power supply to light a light source 310. The lighting circuit 400 is connected to the vehicle ECU 204 through a bus 206 such as Controller Area Network (CAN) and Local Interconnect Network (LIN). The vehicle lamp 300 has an ADB function and dynamically changes a light distribution pattern based on information or a command value from the vehicle ECU 204.

The vehicle lamp 300 includes the light source 310 and the lighting circuit 400. The light source 310 includes a plurality of (N) light emitting elements 312_1 to 312_N connected in series. The light emitting elements 312 are semiconductor light emitting devices, such as Light Emitting Diode (LED), Laser Diode (LD) and organic Electro Luminescence (EL), which emit light with luminance corresponding to a driving current $I_{LAMP}$. The number N of the light emitting elements 312 corresponds to a resolution in controlling the light distribution pattern. The number N is, for example, 4, 8, 12, 24, but is not limited thereto.

The lighting circuit 400 is connected to the light source 310 through wire harness 320. The lighting circuit 400 includes a boost converter 410, a buck converter 430, a bypass switch circuit 450, a voltage adjusting circuit 460, and a light distribution controller 470.

The bypass switch circuit 450 includes a plurality of bypass switches 452_1 to 452_N, and the i-th bypass switch 452_i is connected in parallel with its corresponding light emitting element 312_i of the plurality of light emitting elements 312_1 to 312_N. In FIG. 4, the number of the bypass switches 452 is equal to the number of the light emitting elements 312, but is not limited thereto.

The light distribution controller 470 controls the plurality of bypass switches 452_1 to 452_N of the bypass switch circuit 450, so as to obtain a desired light distribution pattern based on information or a control command from the vehicle ECU 204. Assuming that a forward voltage $V_F$ of the light emitting elements 312 is 5 V and N=12, the output voltage $V_{OUT}$ can vary from 0 to 60 V.

The boost converter 410 has an adjusting (ADJ) terminal and boosts the power supply voltage $V_{BAT}$ to generate a DC voltage $V_{DC}$ which is stabilized at a target voltage $V_{DC(REF)}$ corresponding to a voltage $V_{ADJ}$ of the ADJ terminal. In other words, the boost converter 410 stabilizes the DC voltage $V_{DC}$ at the target voltage $V_{DC(REF)}$ which is proportional to the voltage $V_{ADJ}$ of the ADJ terminal.

In one example, the output voltage $V_{DC}$ of the boost converter 410 is divided by resistors $R_{31}$ and $R_{32}$ and is fed back. The boost converter 410 adjusts a duty ratio of switching such that the voltage-divided feedback signal $V_{FB}$ matches the voltage $V_{ADJ}$ of the ADJ terminal.

In a steady state,
when $K_1=V_{ADJ}/V_{OUT}$ and $K_2=V_{DC}/V_{ADJ}$ are satisfied, $$V_{DC}=K_1 \times K_2 \times V_{OUT}.$$

Here, $K_1 \times K_2$ is referred to as a control gain G If $G=K_1 \times K_2 > 1$, $V_{DC}$ can be maintained at a voltage level higher than the $V_{OUT}$, and the potential difference $\Delta V$ between an input voltage and an output voltage of the buck converter 430 can satisfy $V_{DC}-V_{OUT}=(K_1 \times K_2 -1) \times V_{OUT}$. Here, the potential difference $\Delta V$ refers to the difference between a maximum value of the output voltage $V_{OUT}$ and the input voltage. If the maximum value of the output voltage $V_{OUT}$ is 60 V, and $K_1 \times K_2 = 1.1$, the potential difference $\Delta V$ between the input voltage and the output voltage can be less than $0.1 \times 60 = 6$ V. The potential difference $\Delta V$ is preferably about 1 to 10 V.

The buck converter 430 receives the DC voltage $V_{DC}$ and supplies the driving current $I_{LAMP}$ stabilized at the target current $I_{REF}$ to the light source 310. As described below, the buck converter 430 includes a hysteresis controller 480 of a hysteresis control method. The hysteresis controller 480 stabilizes the driving current $I_{LAMP}$ between a peak value $I_{UPPER}$ and a bottom value $I_{BOTTOM}$ which are defined in proximity to the target current $I_{REF}$. Furthermore, the hysteresis controller 480 changes the difference $\Delta I$ between the peak value $I_{UPPER}$ and the bottom value $I_{BOTTOM}$, such that the switching frequency $f_{SW}$ of the buck converter 430 approaches a constant value.

The voltage adjusting circuit 460 dynamically changes the voltage $V_{ADJ}$ of the ADJ terminal of the boost converter 410 according to the output voltage $V_{OUT}$ of the buck converter 430, that is, the voltage between both ends of the light source 310.

Preferably, the voltage adjusting circuit 460 changes the voltage $V_{ADJ}$ of the ADJ terminal, such that the difference between the target voltage $V_{DC(REF)}$ of the output voltage $V_{DC}$ of the boost converter 410 and the output voltage $V_{OUT}$ of the buck converter 430 (in other words, the difference between the input voltage and the output voltage of the buck converter 430) does not exceed or approaches a predetermined value. For example, the voltage adjusting circuit 460 may change the voltage $V_{ADJ}$ of the ADJ terminal following the peak of the output voltage $V_{OUT}$ of the buck converter 430. For example, the voltage adjusting circuit 460 may also generate the voltage $V_{ADJ}$ based on the peak of the output voltage (output detection voltage) $V_{OUTS}$ divided by resistors $R_{41}$ and $R_{42}$.

Figure 5:
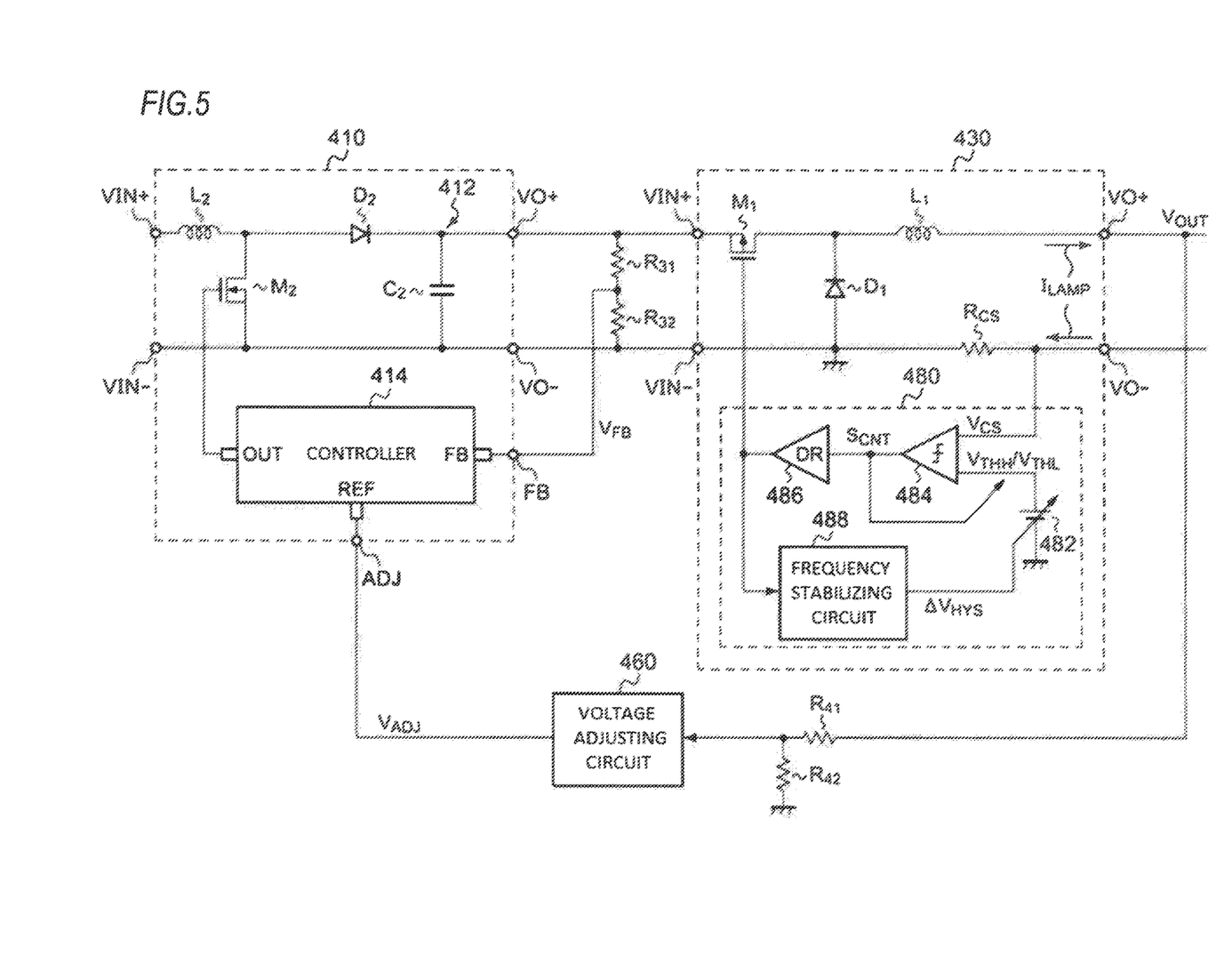
FIG. 5 is a circuit diagram showing a specific configuration example of the lighting circuit.

FIG. 5 is a circuit diagram showing a specific configuration example of the lighting circuit 400. The boost converter 410 includes an output circuit 412 and a controller 414. The output circuit 412 includes an inductor $L_2$, a switching transistor $M_2$, a diode $D_2$, and a capacitor $C_2$. The voltage $V_{ADJ}$ of the ADJ terminal is input to a reference pin REF of the controller 414. A feedback voltage $V_{FB}$ corresponding to the output voltage $V_{DC}$ of the boost converter 410 is fed back to a feedback pin FB of the controller 414. The controller 414 drives the switching transistor $M_2$ such that the feedback voltage $V_{FB}$ matches the reference voltage $V_{ADJ}$. The controller 414 may use a commercially available control IC, and the configuration thereof is not particularly limited.

The buck converter 430 includes an output circuit 432 and the hysteresis controller 480. The configuration of the output circuit 432 is similar to that of FIG. 1. When a current detection signal $V_{CS}$ reaches an upper threshold $V_{THH}$ corresponding to the upper value $I_{UPPER}$ of the driving current $I_{LAMP}$, the hysteresis controller 480 turns off the switching transistor $M_1$, when the current detection signal $V_{CS}$ reaches a lower threshold $V_{THL}$ corresponding to the bottom value $I_{BOTTOM}$ of the driving current $I_{LAMP}$, the hysteresis controller 480 turns on the switching transistor $M_1$, and the hysteresis controller 480 repeatedly performs the above operation.

As described above, the hysteresis controller 480 stabilizes the switching frequency $f_{SW}$ by adjusting the difference between the upper threshold $V_{THH}$ and the lower threshold $V_{THL}$. The hysteresis controller 480 includes a voltage source 482, a comparator 484, a driver 486, and a frequency stabilizing circuit 488. The voltage source 482 is a variable voltage source which generates the upper threshold $V_{THH}$ and the lower threshold $V_{THL}$. The average value of the upper threshold $V_{THH}$ and the lower threshold $V_{THL}$ corresponds to the target value $I_{REF}$ of the driving current $I_{LAMP}$.

When the control pulse $S_{CNT}$ as the output of the comparator 484 is at an ON level (during a period when the switching transistor $M_1$ is on), the comparator 484 compares the current detection signal $V_{CS}$ with the upper threshold $V_{THH}$. When the control pulse $S_{CNT}$ is at an OFF level (during a period when the switching transistor $M_1$ is off), the comparator 484 compares the current detection signal $V_{CS}$ with the lower threshold $V_{THL}$. The driver 486 drives the switching transistor $M_1$ according to the control pulse $S_{CNT}$.

The frequency stabilizing circuit 488 adjusts the potential difference (hysteresis width) $\Delta V_{HYS}$ between the upper threshold $V_{THH}$ and the lower threshold $V_{THL}$ such that the switching frequency $f_{SW}$ of the switching transistor $M_1$ matches a target frequency $f_{REF}$. Particularly, when the switching frequency $f_{SW}$ is higher than the target frequency $f_{REF}$, the hysteresis width $\Delta V_{HYS}$ is increased so as to decrease the switching frequency $f_{SW}$. When the switching frequency $f_{SW}$ is lower than the target frequency $f_{REF}$, the hysteresis width $\Delta V_{HYS}$ is decreased so as to increase the switching frequency $f_{SW}$.

Figure 6A:
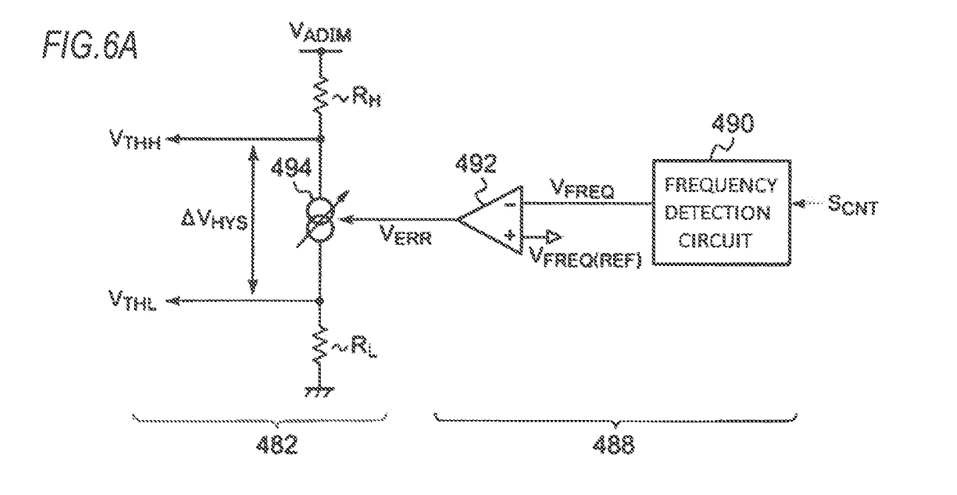
FIGS. 6A and 6B are circuit diagrams showing configuration examples of a frequency stabilizing circuit.
Figure 6B:
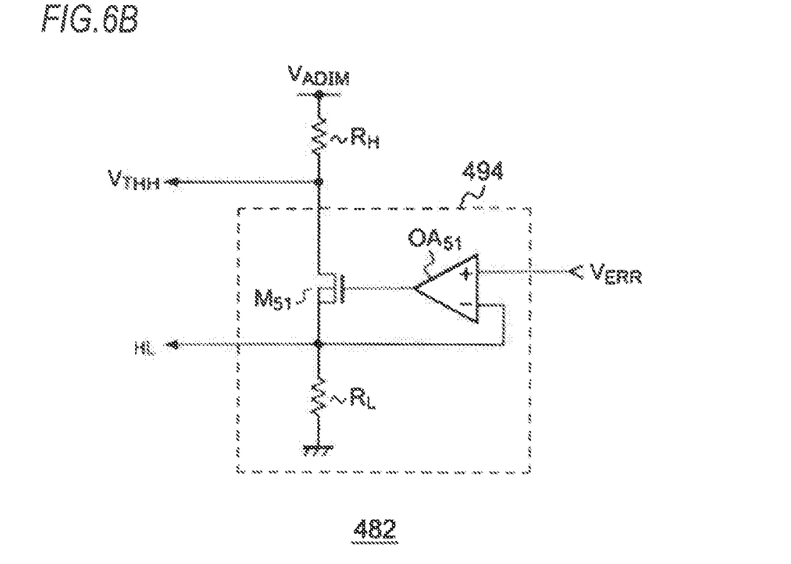

FIGS. 6A and 6B are circuit diagrams showing the specific configuration examples of the frequency stabilizing circuit 488. The frequency stabilizing circuit 488 includes a frequency detection circuit 490 and an error amplifier 492. The frequency detection circuit 490 receives the control pulse $S_{CNT}$ or a signal having the same frequency with the control pulse $S_{CNT}$, and generates a frequency detection signal $V_{FREQ}$ representing the switching frequency $f_{SW}$. The error amplifier 492 amplifies the error between the frequency detection signal $V_{FREQ}$ and a reference signal $V_{FREQ(REF)}$ which represents the target value of the switching frequency.

The voltage source 482 generates the upper threshold $V_{THH}$ and the lower threshold $V_{THL}$ according to an error signal $V_{ERR}$. For example, the voltage source 482 includes resistors $R_H$, $R_L$ and a current source 494. The current source 494 outputs a current $I_{ERR}$ corresponding to the error signal $V_{ERR}$. An analog voltage $V_{ADIM}$ is applied to one end of the resistor $R_H$, and $V_{THH}$ is generated at the other end of the resistor $R_H$ where $V_{THH}=V_{ADIM}-I_{ERR} \times R_H$. One end of the resistor $R_L$ is grounded, and $V_{THL}$ is generated at the other end of the resistor $R_L$ where $V_{THL}=I_{ERR} \times R_L$.

If $R_H=R_L=R$, the average value of the $V_{THH}$ and $V_{THL}$ is $V_{ADIM}/2$. Therefore, the average value of the coil current $I_L$, that is, the luminance of the light source 310, can be dimmed according to the voltage $V_{ADIM}$. In addition, the difference (hysteresis width $\Delta V_{HYS}$) between the $V_{THH}$ and $V_{THL}$ satisfies $\Delta V_{HYS}=2 \times I_{ERR} \times R$.

The specific configuration example of the voltage source 482 is shown in FIG. 6B. The current source 494 includes an operational amplifier $OA_{51}$, a transistor $M_{51}$, and a resistor $R_L$. In this configuration, $V_{THL}=V_{ERR}$ and $I_{ERR}=V_{ERR}/R_L$.

Other than the examples shown in FIGS. 6A and 6B, those skilled in the art can design the frequency stabilizing circuit 488 or the voltage source 482 with equivalent functions, which are included in the scope of the invention.

Figure 7:
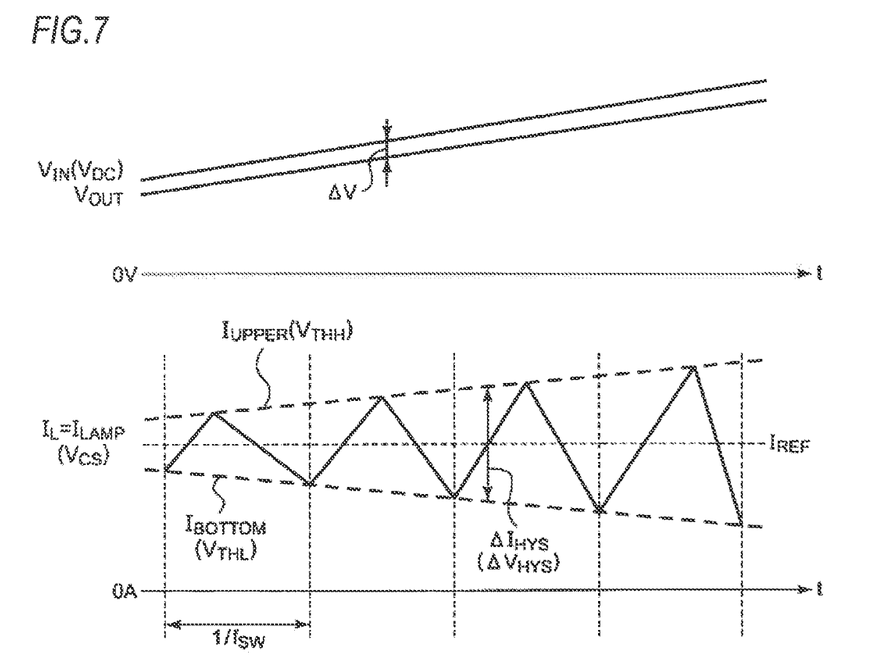
FIG. 7 is a waveform diagram showing basic operation of the lighting circuit.

The configuration of the lighting circuit 400 is described as above. Next, operation of the lighting circuit 400 will be described. FIG. 7 is a waveform diagram showing basic operation of the lighting circuit 400. For concise explanation and easy understanding, the operation is shown when the number of the bypass switches 452 which are on is decreased over time without performing PWM dimming in the bypass switch circuit 450. In this case, the output voltage $V_{OUT}$ rises with time. The voltage adjusting circuit 460 increases the voltage $V_{ADJ}$ of the ADJ terminal according to the rise of the output voltage $V_{OUT}$. Therefore, the input voltage $V_{IN}$ ($V_{DC}$) of the buck converter 430 follows the rise of the output voltage $V_{OUT}$. Here, for ease of explanation, it is assumed that the difference $\Delta V$ between the input voltage and output voltage remains constant.

Next, the operation of the buck converter 430 is explained. When the potential difference $\Delta V$ between the input voltage and output voltage is substantially constant, a rising slope $(V_{IN}-V_{OUT})/L_1$ of the coil current $I_L$ (lamp current $I_{LAMP}$) is substantially constant. On the other hand, a falling slope $-V_{OUT}/L_1$ becomes steep as the output voltage $V_{OUT}$ rises. The buck converter 430 changes the difference $\Delta I_{HYS}$ between the upper limit current $I_{UPPER}$ and the lower limit current $I_{BOTTOM}$ such that the switching frequency $f_{SW}$ (period: $1/f_{SW}$) becomes constant.

Specifically, the frequency stabilizing circuit 488 of the buck converter 430 adjusts the difference $\Delta I_{HYS}$ between the upper threshold $V_{THH}$ and the lower threshold $V_{THL}$ such that the switching frequency $f_{SW}$ becomes constant. The hysteresis width $\Delta V_{HYS}$ increases as the output voltage $V_{OUT}$ rises.

Figure 8:
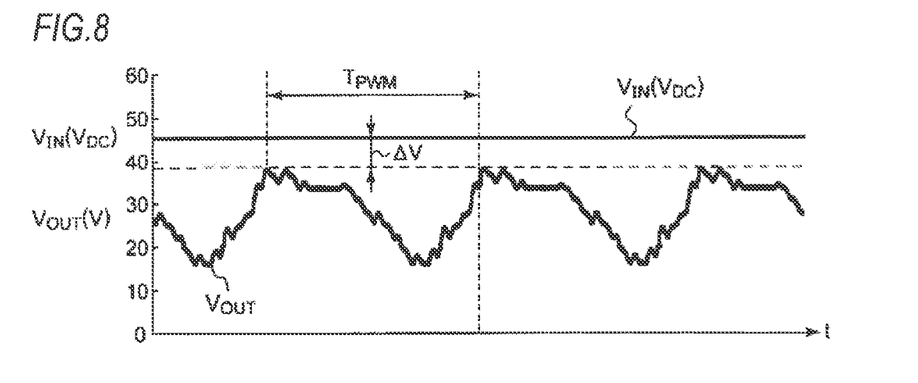
FIG. 8 is an operation waveform diagram when the lighting circuit of FIG. 4 performs PWM dimming.

The basic operation of the lighting circuit 400 is described as above. FIG. 8 is an operation waveform diagram when the lighting circuit 400 of FIG. 4 performs the PWM dimming. When the light distribution pattern is constant, each bypass switch 452 of the bypass switch circuit 450 is controlled repeatedly with a same pattern, and the output voltage $V_{OUT}$ of the buck converter 430 repeats the same waveform over the PWM period $T_{PWM}$. A PWM period $T_{PWM}$ is a few milliseconds, such as about 3 to 5 ms.

In this example, the output voltage $V_{OUT}$ varies from 15 to 40V in the PWM period $T_{PWM}$. The voltage adjusting circuit 460 generates the voltage $V_{ADJ}$ corresponding to the peak of the output voltage $V_{OUT}$, i.e., 40V and supplies it to the ADJ terminal. When the control gain G=1.1, the output voltage $V_{DC}$ of the boost converter 410 is stabilized at 44V, and the potential difference $\Delta V$ between the input voltage and output voltage of the buck converter 430 is 4 V.

The operation of the lighting circuit 400 is described as above. Next, advantages of the lighting circuit 400 will be described.

According to the lighting circuit 400, since the buck converter 430 employs the hysteresis control, the output voltage $V_{OUT}$ of the buck converter 430 can follow high speed load variation. Further, since the switching frequency $f_{SW}$ can be stabilized by adjusting the difference $\Delta I_{HYS}$ between the peak value $I_{UPPER}$ and bottom value $I_{BOTTOM}$ of the driving current $I_{LAMP}$, the noise specs can be cleared.

Figure 9A:
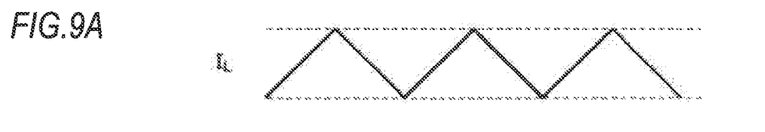
FIGS. 9A and 9B are diagrams illustrating further advantages of the lighting circuit.
Figure 9B:
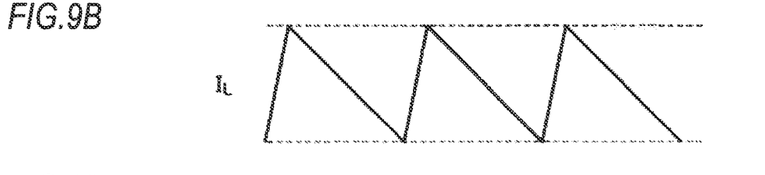

FIGS. 9A and 9B are diagrams illustrating further advantages of the lighting circuit 400. FIG. 9A shows the coil current $I_L$ of the lighting circuit 400 of FIG. 4, and FIG. 9B shows the coil current $I_L$ when the output $V_{DC}$ of the buck converter 430 is constant. For example, $V_{OUT}=20$ V and $V_{DC}=22$ V in FIG. 9A, and $V_{OUT}=20$ V and $V_{DC}=60$ V in FIG. 9B. When comparing FIG. 9A with FIG. 9B, FIG. 9B has the same falling slopes as FIG. 9A but larger rising slope than FIG. 9A. In this case, assuming that the inductance values $L_1$ of the buck converters are the same, the ripple width of the coil current $I_L$ in FIG. 9B is larger to obtain the desired same switching frequency $f_{SW}$. In particular, when employing a frequency stabilizing control, a ripple width becomes further larger as the output voltage $V_{OUT}$ rises. Therefore, in order to keep the ripple width within the allowable range while keeping the direct voltage $V_{DC}$ to 60 V and within a range of the output voltage $V_{OUT}$, the inductance value $L_1$ needs be significantly increased, so that an expensive and large component needs to be selected as the inductor $L_1$.

In this respect, according to the lighting circuit 400, the potential difference between the input voltage and output voltage of the buck converter 430 can be suppressed by the voltage adjusting circuit 460. Therefore, a small inductance value $L_1$ can be selected and can be small-sized even when the frequency stabilizing control is employed in the buck converter 430. Further, cost of the device can be reduced since components with low inductance value are usually inexpensive.

In particular, the voltage adjusting circuit 460 changes the voltage $V_{ADJ}$ of the ADJ terminal such that the difference $\Delta V$ between the target voltage $V_{DC(REF)}$ of the boost converter 410 and the output voltage $V_{OUT}$ of the buck converter 430 does not exceed or approaches a predetermined value. Further, the size of the inductor can be reduced by decreasing that predetermined value.

Next, the control when the light distribution pattern is dynamically changed will be described. When the light distribution pattern is constant, the output voltage $V_{OUT}$ varies in a PWM period but the peak of the output voltage $V_{OUT}$ is constant. In contrast, the peak value of the output voltage $V_{OUT}$ varies when the light distribution pattern changes.

The voltage adjusting circuit 460 changes the voltage $V_{ADJ}$ of the ADJ terminal faster at the rise of the output voltage $V_{OUT}$ of the buck converter 430 than at the fall of the output voltage $V_{OUT}$. The rise and fall here refers to those in the time scale not shorter than the PWM period and longer than the PWM period. Specifically, the voltage $V_{ADJ}$ of the ADJ terminal preferably varies in a time shorter than the control period (a PWM period) $T_{PWM}$ of the bypass switch circuit 450 during the rise of the output voltage $V_{OUT}$ of the buck converter 430. For example, the voltage $V_{ADJ}$ of the ADJ terminal follows the output voltage $V_{OUT}$ within a time scale shorter than ½ of the PWM period $T_{PWM}$. Therefore, the insufficiency of the output voltage $V_{OUT}$ can be suppressed and the decreasing of the luminance of the light source 310 can be suppressed.

On the contrary, the voltage $V_AW$ of the ADJ terminal preferably varies in a time longer than the control period $T_{PWM}$ of the bypass switch circuit 450 during the fall of the output voltage $V_{OUT}$ of the buck converter 430. For example, the voltage $V_{ADJ}$ of the ADJ terminal follows the output voltage $V_{OUT}$ within a time scale longer than three or five times of the control period $T_{PWM}$.

Figure 10A:
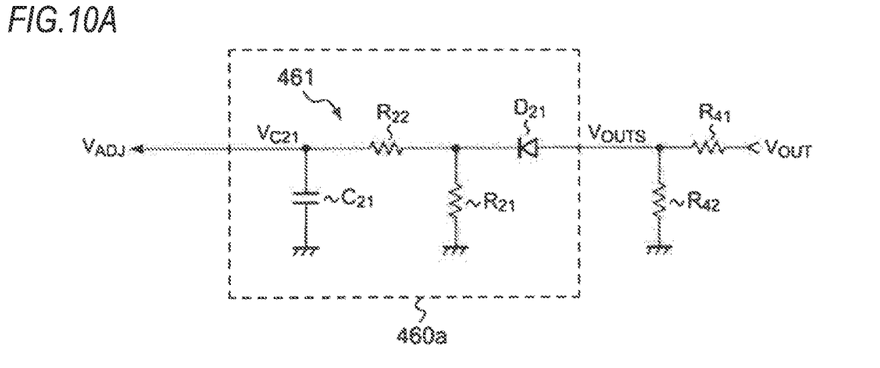
FIGS. 10A and 10B are circuit diagrams showing configuration examples of a voltage adjusting circuit.

FIGS. 10A and 10B are circuit diagrams showing configuration examples of the voltage adjusting circuit 460. A voltage adjusting circuit 460a of FIG. 10A includes a diode $D_{21}$, a first resistor $R_{21}$, a second resistor $R_{22}$, and a capacitor $C_{21}$. The voltage adjusting circuit 460a can be regarded as a peak hold circuit 461, and the voltage $V_{ADJ}$ of the ADJ terminal corresponds to the output voltage $V_{C21}$ of the peak hold circuit 461.

Figure 10B:
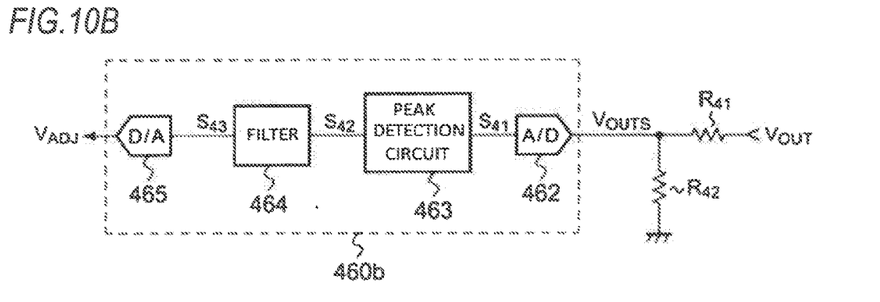

A voltage adjusting circuit 460b of FIG. 10B is configured by a digital circuit. An A/D converter 462 converts the output detection voltage $V_{OUTS}$ into a digital value $S_{41}$. A peak detection circuit 463 is used for generating a peak detection signal $S_{42}$ representing a peak of the digital value $S_{41}$. A filter 464 receives the peak detection signal $S_{42}$ and has a faster responsiveness in rising direction and a slower responsiveness in falling direction. A D/A converter 465 converts an output voltage $S_{43}$ of the filter 464 into an analog voltage $V_{ADJ}$.

Figure 11A:
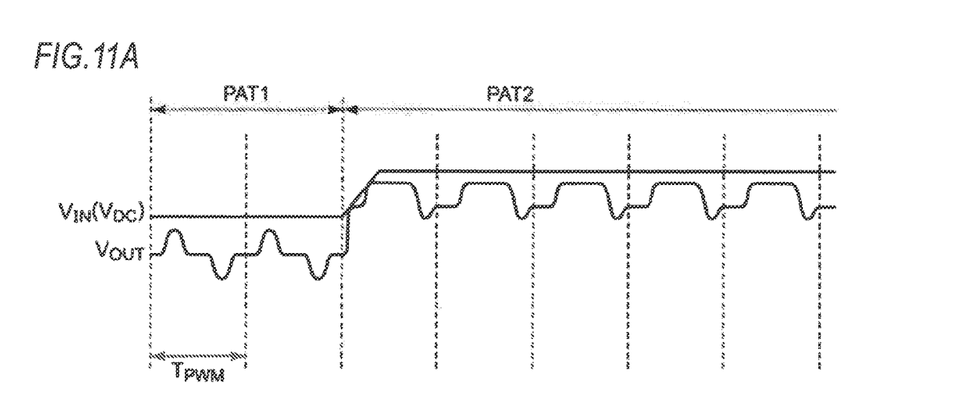
FIGS. 11A and 11B are operation waveform diagrams of the lighting circuit when a light distribution pattern is changed.
Figure 11B:
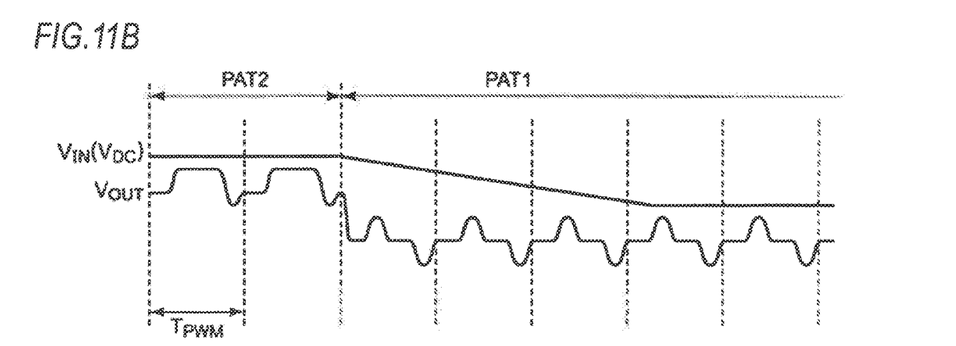

FIGS. 11A and 11B are operation waveform diagrams of the lighting circuit 400 when the light distribution pattern is changed. FIG. 11A shows the operation when a dark light distribution pattern PAT1 is changed to a bright light distribution pattern PAT2. At this time, the average value and the peak value of the output voltage $V_{OUT}$ rise, and the waveform of the output voltage $V_{OUT}$ changes. The voltage $V_{ADJ}$ of the ADJ terminal quickly follows the rise of the peak value of the output voltage $V_{OUT}$ in a time scale shorter than a PWM period $T_{PWM}$ (preferably, a time scale shorter than $T_{PWM}/2$). Therefore, the decreasing of the luminance of the light source 310 caused by the insufficiency of the output voltage $V_{OUT}$ can be avoided.

FIG. 11B shows the operation when the bright light distribution pattern PAT2 is changed to the dark light distribution pattern PAT1. At this time, the average value and peak value of the output voltage $V_{OUT}$ fall, and the waveform of the output voltage $V_{OUT}$ changes. The voltage $V_{ADJ}$ of the ADJ terminal slowly follows the fall of the peak value of the output voltage $V_{OUT}$ in a time scale longer than several times of the PWM period $T_{PWM}$ (preferably, a time scale longer than $3 \times T_{PWM}$). Therefore, oscillation or instability of system including the boost converter 410 and the buck converter 430 can be prevented.

Although the present invention has been described based on the embodiments, the embodiments merely show the principle and application of the present invention. Various changes of modifications and configurations may be made in the embodiments without departing from the inventive concept as defined in the claims.

(First modification)

In the above-described embodiment, the voltage $V_{ADJ}$ of the ADJ terminal is changed according to the output voltage $V_{OUT}$. However, the present invention is not limited thereto. Switching patterns of the plurality of bypass switches 452 for each light distribution pattern are known. Therefore, a waveform of the output voltage $V_{OUT}$ in each light distribution pattern can be estimated by calculation.

Figure 12:
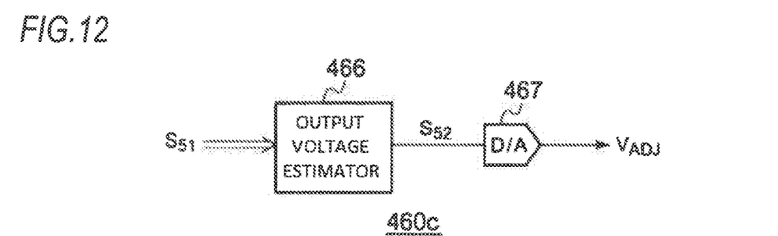
FIG. 12 is a block diagram of a voltage adjusting circuit according to a first modification.

FIG. 12 is a block diagram of a voltage adjusting circuit 460c according to a first modification. The voltage adjusting circuit 460c estimates a peak value of a voltage between both ends of the light source 310 (i.e. a peak value of the output voltage $V_{OUT}$ of the buck converter 430) in one PWM period based on a pattern of ON/OFF states of the plurality of bypass switches 452_1 to 452_N, and controls the voltage $V_{ADJ}$ of the ADJ terminal based on the estimated value. For example, an output voltage estimator 466 receives information $S_{51}$ of the light distribution pattern and generates a peak value $S_{52}$ of the output voltage $V_{OUT}$ within the PWM period based on the information $S_{51}$. For example, a table showing a relationship between the light distribution pattern and the peak value may be held in the output voltage estimator 466. A D/A converter 467 converts the peak value $S_{52}$ into an analog signal and outputs it to the ADJ terminal. Functions of the output voltage estimator 466 and the D/A converter 467 may be implemented in the light distribution controller 470 or in the lamp ECU common to the light distribution controller 470.

According to this modification, the input voltage $V_{DC}$ of the buck converter 430 may be adjusted to a suitable voltage level by the feed forward control without detecting the output voltage $V_{OUT}$.

(Second modification)

Figure 13A:
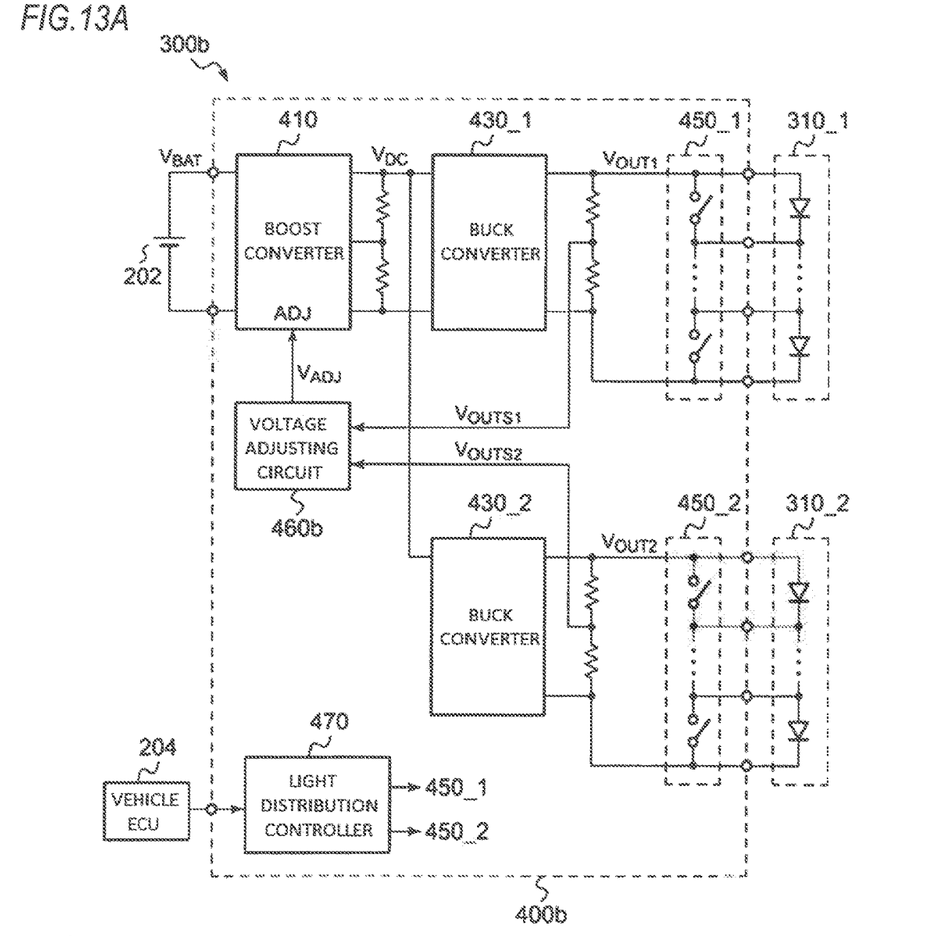
FIGS. 13A and 13B are block diagrams of a lighting circuit according to a second modification.
Figure 13B:
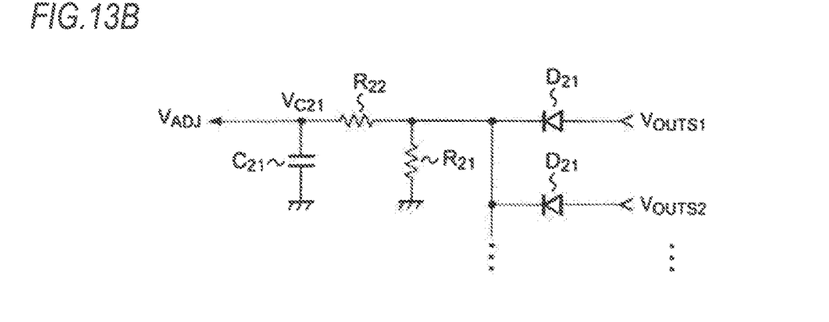

FIGS. 13A and 13B are block diagrams of a lighting circuit 400b according to a second modification. The lighting circuit 400b drives a plurality (two channels here) of light sources 310_1 and 310_2. The lighting circuit 400b includes a plurality of buck converters 430_1 and 430_2 corresponding to the plurality of light sources 310_1 and 310_2, respectively. The plurality of buck converters 430_1 and 430_2 receive an output voltage $V_{DC}$ of a boost converter 410. A voltage adjusting circuit 460b changes the voltage $V_{ADJ}$ of the ADJ terminal according to the highest voltage among output voltages $V_{OUT1}$ and $V_{OUT2}$ of the plurality of buck converters 430_1 and 430_2.

FIG. 13B shows a configuration example of the voltage adjusting circuit 460b. The configuration of the voltage adjusting circuit 460b is the same as that of FIG. 10A. A plurality of diodes $D_{21}$ corresponding to the plurality of channels have a shared cathode. The plurality of diodes $D_{21}$ function as a maximum value circuit, and a voltage corresponding to the maximum voltage among the plurality of output detection voltages $V_{OUTS1}$ and $V_{OUTS2}$ is generated at the cathode.

What is claimed is:

1. A lighting circuit configured to drive a light source including a plurality of light emitting elements connected in series, the lighting circuit comprising:
    a bypass switch circuit which includes a plurality of bypass switches, each being connected in parallel with corresponding light emitting element of the plurality of light emitting elements;
    a boost converter which is configured to boost a power supply voltage to generate a direct current voltage stabilized at a variable target voltage;
    a buck converter which is configured to receive the direct current voltage to supply a driving current stabilized at a target current to the light source and which includes a hysteresis controller, wherein the hysteresis controller is configured to stabilize the driving current between a peak value and a bottom value which are defined in proximity to the target current and to change a difference between the peak value and the bottom value such that a switching frequency of the buck converter approaches a constant value; and
    a voltage adjusting circuit which is configured to dynamically change the target voltage of the boost converter according to an output voltage of the buck converter.

2. The lighting circuit according to claim 1,
    wherein the voltage adjusting circuit is configured to change the target voltage such that a difference between the target voltage of the boost converter and the output voltage of the buck converter does not exceed or approaches a predetermined value.

3. The lighting circuit according to claim 1,
    wherein the voltage adjusting circuit is configured to change the target voltage faster at rise of the output voltage of the buck converter than at fall of the output voltage of the buck converter.

4. The lighting circuit according to claim 1,
    wherein the voltage adjusting circuit is configured to change the target voltage in a time shorter than a control period of the bypass switch circuit when the output voltage of the buck converter rises.

5. The lighting circuit according to claim 1,
    wherein the voltage adjusting circuit is configured to change the target voltage changes in a time longer than a control period of the bypass switch circuit when the output voltage of the buck converter falls.

6. The lighting circuit according to claim 5,
    wherein the voltage adjusting circuit is configured to change the target voltage in a time longer than three times of the control period of the bypass switch circuit when the output voltage of the buck converter falls.

7. The lighting circuit according to claim 1,
    wherein the voltage adjusting circuit includes a peak hold circuit which is configured to receive an output detection voltage corresponding to the output voltage of the buck converter, and the target voltage is corresponding to an output voltage of the peak hold circuit.

8. The lighting circuit according to claim 1,
    wherein the voltage adjusting circuit includes:
    a diode which is configured to receive an output detection voltage corresponding to the output voltage of the buck converter at an anode thereof;
    a first resistor which is provided between a cathode of the diode and a ground;
    a capacitor which includes one end grounded; and
    a second resistor which is provided between the other end of the capacitor and the cathode of the diode, and
    wherein the target voltage is set according to a voltage of the capacitor.

9. The lighting circuit according to claim 1,
    wherein the voltage adjusting circuit includes:
    an analogue to digital (A/D) converter which is configured to convert an output detection voltage corresponding to the output voltage of the buck converter into a digital value;
    a peak detection circuit which is configured to generate a peak detection signal representing a peak of the digital value;
    a filter which is configured to receive the peak detection signal and has a faster responsiveness in a rising direction and a slower responsiveness in a falling direction; and
    a digital to analogue (D/A) converter which is configured to convert an output signal of the filter into an analog voltage, and
    wherein the target voltage is set according to the analog voltage.

10. The lighting circuit according to claim 1, further comprising:
    a light distribution controller which is configured to control the plurality of bypass switches according to a desired light distribution pattern,
    wherein the voltage adjusting circuit is configured to control the target voltage based on a voltage between both ends of the light source estimated from ON/OFF states of the plurality of bypass switches.

11. The lighting circuit according to claim 1,
    wherein the lighting circuit is configured to drive a plurality of light sources and includes a plurality of buck converters corresponding to the plurality of light sources, respectively, and
    wherein the voltage adjusting circuit is configured to change the target voltage according to a highest voltage among output voltages of the plurality of buck converters.

12. A vehicle lamp comprising:
    a light source including a plurality of light emitting elements connected in series; and
    the lighting circuit according to claim 1 configured to drive the light source.

* * * * *